US008996771B1

(12) United States Patent
Lockwood

(10) Patent No.: US 8,996,771 B1
(45) Date of Patent: Mar. 31, 2015

(54) SYSTEM AND METHOD FOR COMMUNICATION VIA UNIVERSAL SERIAL BUS

(75) Inventor: Michael Lockwood, Mountain View, CA (US)

(73) Assignee: Google Inc., Mountain View, CA (US)

( * ) Notice: Subject to any disclaimer, the term of this patent is extended or adjusted under 35 U.S.C. 154(b) by 144 days.

(21) Appl. No.: 13/103,926

(22) Filed: May 9, 2011

(51) Int. Cl.
G06F 13/42 (2006.01)
G06F 9/44 (2006.01)
G06F 13/38 (2006.01)

(52) U.S. Cl.
CPC ............ *G06F 9/4411* (2013.01); *G06F 13/385* (2013.01)
USPC ...................................................... 710/106

(58) Field of Classification Search
CPC .................................................... G06F 9/4411
USPC ....................................................... 710/106
See application file for complete search history.

(56) References Cited

U.S. PATENT DOCUMENTS

| 5,822,614 | A  | * | 10/1998 | Kenton et al. ................... 710/8 |
| 6,529,744 | B1 | * | 3/2003  | Birkler et al. ................. 455/557 |
| 6,571,305 | B1 |   | 5/2003  | Engler |
| 6,804,727 | B1 |   | 10/2004 | Rademacher |
| 6,922,748 | B2 |   | 7/2005  | Engler |
| 7,062,260 | B2 | * | 6/2006  | Vuori ............................. 455/418 |
| 7,246,189 | B2 |   | 7/2007  | Ulenas |
| 7,480,758 | B2 |   | 1/2009  | Lin et al. |
| 7,627,708 | B2 |   | 12/2009 | Bohm et al. |
| 8,271,033 | B2 | * | 9/2012  | Bunk et al. ................. 455/556.1 |
| 2003/0162562 | A1 | * | 8/2003 | Curtiss et al. ................. 455/556 |
| 2004/0225836 | A1 | * | 11/2004 | Lin ................................ 711/115 |
| 2004/0239294 | A1 | * | 12/2004 | Veselic et al. ................. 320/155 |
| 2007/0124517 | A1 | * | 5/2007 | Seo et al. ......................... 710/62 |
| 2007/0270184 | A1 | * | 11/2007 | Hurula et al. ................. 455/557 |
| 2009/0198361 | A1 | * | 8/2009 | Schubert et al. ................ 700/94 |
| 2011/0055407 | A1 | * | 3/2011 | Lydon et al. .................. 709/228 |

OTHER PUBLICATIONS

Universal Serial Bus. Wikipedia, the free encyclopedia, [online], [retrieved on May 6, 2011] Retrieved from <URL: http://en.wikipedia.org/wiki/Universal_Serial_Bus.

* cited by examiner

*Primary Examiner* — Nimesh G Patel
(74) *Attorney, Agent, or Firm* — Morris & Kamlay LLP

(57) ABSTRACT

A system and method for serial communication between a USB host and a USB device. The USB device is a handheld microprocessor equipped device capable of functioning as a general purpose computer. The USB host places the USB device in an accessory mode which permits the USB host to transmit its configuration information to the USB device. This configuration information can include the manufacturer and product ID of the USB host. The USB device, in accessory mode, uses this configuration information to acquire and load application software (such as by downloading the software from the Internet). The application software enables the USB device to provide a programmable function to the USB host and to enable applications on the USB host and device to communicate on a peer-to-peer basis via the USB communications channel.

32 Claims, 9 Drawing Sheets

SYSTEM AND METHOD FOR COMMUNICATION VIA UNIVERSAL SERIAL BUS

TECHNICAL FIELD

The present invention relates to data communications generally and in particular to communication between a host and a peripheral device using the Universal Serial Bus (USB) standard.

BACKGROUND

The Universal Serial Bus or "USB" is a well-known standard for serial communications. There have been several iterations of the USB standard, most recently the Universal Serial Bus 3.0 Specification published on Nov. 12, 2008. The USB standard connects one or more USB "devices" with a USB "host." Devices are either "hubs" or "functions." Hubs are used to connect multiple devices. Functions, sometimes referred to as "USB-compliant devices" or simply "devices," are typically computer peripherals such as keyboards or storage devices.

The USB standard specifies a master-slave bus architecture. The host serves as master and the devices serve as slaves. Devices can communicate with the host only when permitted to do so by the host. A host also provides power to a device if necessary. Communication between the host and devices is based on logical channels known as endpoints. Endpoints for data are unidirectional. A special endpoint used for messages is bidirectional.

Before a device can communicate with the host, it must be configured by the host through a process known as "enumeration." Enumeration begins by the host sending a reset signal to the device. The device in turn provides configuration information in the form of one or more descriptors. Descriptors contain information in a defined format that reveals to the host the manufacturer, product and other information about the device. The host then loads necessary device drivers or other software to permit it to use the function rendered by the device.

SUMMARY

Systems and methods for communicating between a USB host and a USB device are disclosed herein. In accordance with one embodiment, a method includes connecting the USB host and USB device via a USB communications channel. A USB communications session is established between the USB host and USB device. The USB host transmits host configuration information to the USB device sufficient to permit the USB device to identify the USB host.

In accordance with another aspect of the embodiments, a method for using a handheld computing device as a peripheral to a USB host. The method includes connecting the USB host to the handheld computing device a USB communications channel in which the handheld computing device function as a USB device; transmitting a request from the USB host to the USB device to enter into an accessory mode. In the accessory mode, the USB device accepts host configuration information. A determination is made as to whether the USB device is in the accessory mode. If the USB device is in accessory mode, then the host transmits host configuration information to the USB device sufficient to permit the USB device to identify the USB host.

Embodiments of a system for communicating between a host and a device are also disclosed herein. In accordance with one aspect of such embodiments, a system includes a USB accessory and a USB device. A USB communications channel couples the USB host and USB device. A host memory and a host processor are resident on or coupled to the USB host. The host processor is configured to execute instructions in the host memory to: transmit a request from the USB host to the USB device to enter into an accessory mode wherein the USB device accepts host configuration information; and transmit host configuration information from the USB host to the USB device sufficient to permit the USB device to identify the USB host.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
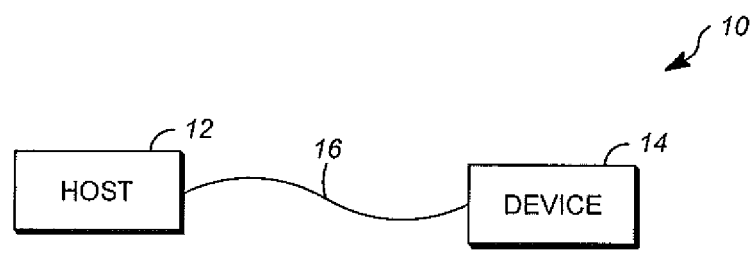
FIG. 1 is a block diagram of a system.

FIG. 1 is a block diagram of a system 10. System 10 includes a USB host 12 and a USB device 14 coupled together by a USB-compliant communications channel 16. USB host 12 is referred to herein as USB host accessory 12 or sometimes simply as an accessory. In this case, USB host accessory 12 is a special purpose machine, such as a microprocessor-controlled exercise machine, a general purpose computer, an automobile, office equipment, a medical device or any one of an broad range of processor-enabled machines. USB device 14 is a handheld computing device such as a mobile telephone, tablet computer or personal digital assistant. However, USB device 14 need not be a handheld device and can be for example any machine equipped to function as a USB device.

The USB protocol was developed for and works especially well with configurations of hosts that are general purpose computers and devices that are limited function peripherals. However, in recent years USB compatible devices have become very powerful, essentially evolving into machines having programmable computing capacity. It would be desirable to use these machines as dynamically programmable USB compliant devices to interact with a variety of hosts.

For example, a user of USB device 14 may desire to use the device to control or interact with USB host accessory 12, such as to use device 14 to read data that is collected by the host accessory 12 or to perform diagnostics on host accessory 12. This may not be possible with conventional deployments of the USB protocol because frequently device 14 is a device (such as a mobile telephone) that might not include software necessary to interact with USB host accessory 12. Conventionally, this problem could be overcome if device 14 were equipped to function as a USB host itself and the accessory were equipped to function as a USB slave device. In that case, it might be possible to attach the exercise machine or other accessory (functioning as USB device) to the mobile telephone or other machine (functioning as USB host) to permit the mobile telephone or other machine to discover the accessory's configuration and acquire the necessary drivers or other software to interoperate with the accessory.

However, in practice, device 14 might not be able to function as a USB host for a number of reasons. For example, the USB standard requires that a host provide power. A handheld device such as a mobile telephone may have a limited power supply. It may not be practical to use such a device as a USB host in many situations. Therefore, in practice device 14 interfaces with accessory 12 as a USB device (not as a host). The USB standard as currently implemented does not provide for a convenient mechanism by which device 14 can discover the configuration of its host and acquire software to provide functions that can usefully interoperate with the host.

A system and method is illustrated in the following embodiments under which USB device 14 accepts configuration information from USB host accessory 12. This configuration information identifies host accessory 12 to USB device 14 and permits USB device 14 to acquire and/or load software to render functions that can usefully interoperate with the host accessory 12. This mode of operation between USB accessory host 12 and USB device 14 is sometimes referred to herein as the "accessory mode."

Figure 2:
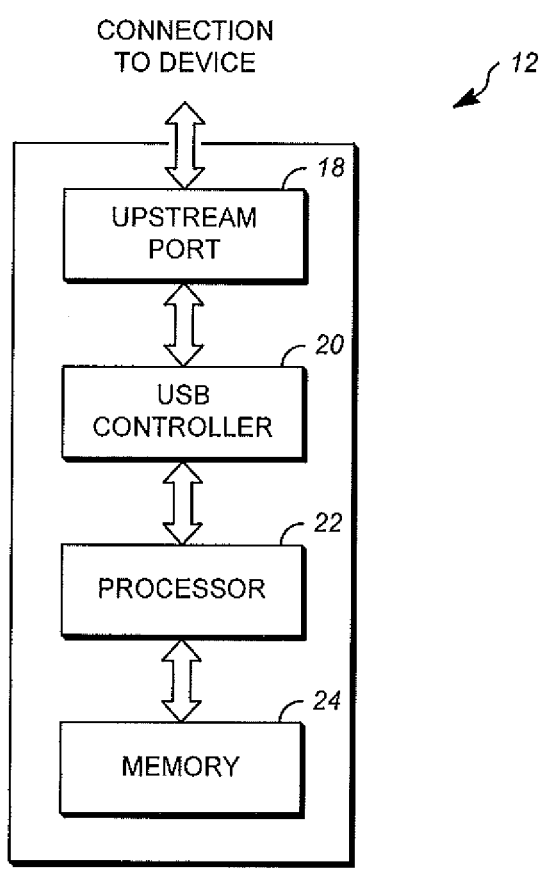
FIG. 2 is a block diagram of a USB host shown in FIG. 1.

For example, host accessory 12 can be a microprocessor-controlled exercise bicycle. The user of the exercise bicycle can attach device 14 while exercising. Device 14 (while acting as a USB slave device) can identify the exercise bicycle and then execute software that permits the user to interface with the exercise bicycle using device 14. For example, the software can be previously installed, or can be retrieved after identifying the exercise bicycle, such as by download from the Internet or other network source. This interface can be achieved by having an application running on the exercise bicycle communicate with the application downloaded to device 14. Other practical examples are discussed in connection with FIGS. 10-14 below. The exercise bicycle and other examples provided herein are illustrative and not exhaustive examples; the invention described herein can be practiced with However, USB host accessory can be a general purpose machine such as a personal computer. FIG. 2 is a block diagram of USB host accessory 12 shown in FIG. 1. Host accessory 12 includes an upstream port 18. Upstream port 18 provides a physical connection to device 14 via USB compliant communications channel 16. Host accessory 12 also includes a USB controller 20, a processor 22, and a memory 24. USB controller 20 is coupled to (and in some cases can be integrated with) upstream port 18. USB controller 20 interacts with processor 22 via an internal bus. Processor 22 is a microprocessor, but can be any suitable circuit or other component that is capable of processing information including without limitation a programmed general purpose computer, a special purpose computer, an ASIC, a programmable logic array, optical processor, programmable logic controller, microcode, firmware, a microcontroller, a server, or a digital signal processor. All of these types of devices are referred to herein as "processors." Memory 24 is a random access memory or "RAM." However, any other suitable type of memory can be used. Memory 24 contains program instructions and data used by processor 22 to realize the disclosed embodiments.

Figure 3:
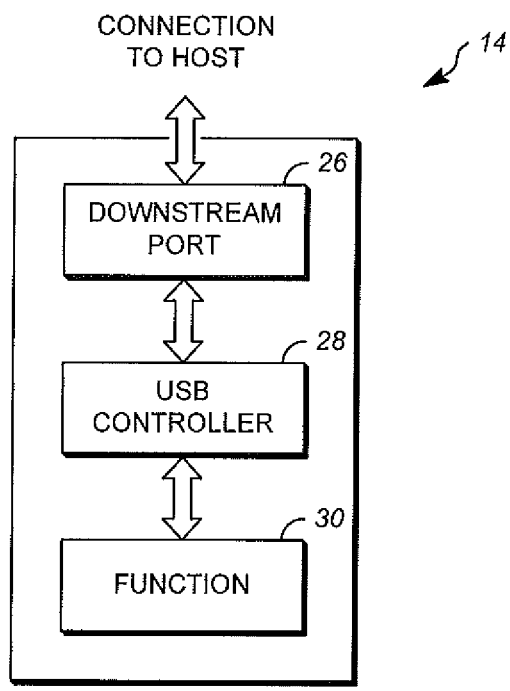
FIG. 3 is a block diagram of a USB device shown in FIG. 1.

FIG. 3 is a block diagram of USB device 14 shown in FIG. 1. USB device 14 includes a downstream port 26, a USB controller 28 and a function 30 that is coupled to USB controller via an internal bus. Downstream port 26 provides a physical connection to host accessory 12 via USB compliant communication channel 16. USB controller 28 is coupled to (and in some cases can be integrated with) downstream port 26. Function 30 refers to the functionality rendered by the USB compliant device to the USB host. Function 30 can be realized through the use of processors, memory, displays, user-input devices and other hardware and software. In this case, USB device 14 is a microprocessor-equipped mobile telephone, which has the functionality of a general purpose computer and which, when provisioned with the appropriate application software, can provide an selected range of functionality range of functionality for use by the USB host accessory 12.

Figure 4:
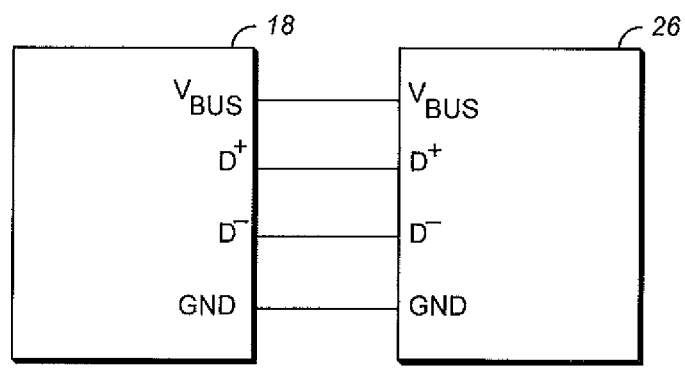
FIG. 4 is a schematic diagram of the electrical interconnection between the USB host and USB device shown in FIG. 1.

FIG. 4 is a schematic diagram of the electrical interconnection between upstream port 18 and downstream port 26 over the USB compliant communications channel 16. As specified by the USB protocol, this electrical interconnection includes four lines: $V_{BUS}$ and GND, which provide positive voltage supply and ground, respectively, and D+ and D−, which provide for data communications.

Figure 5A:
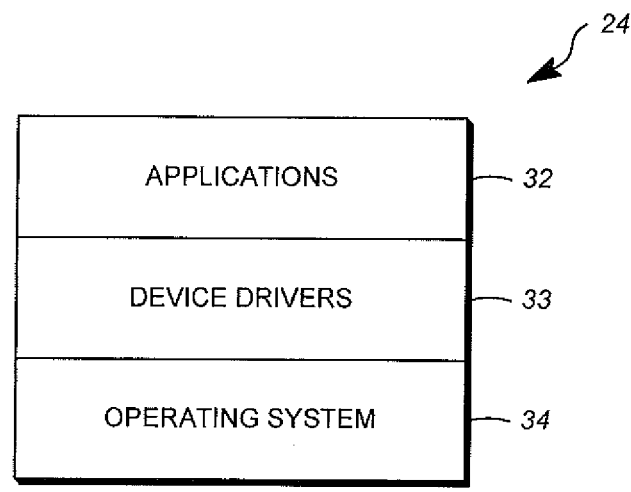
FIG. 5A is a block diagram of the memory of the USB host shown in FIG. 2.
Figure 5B:
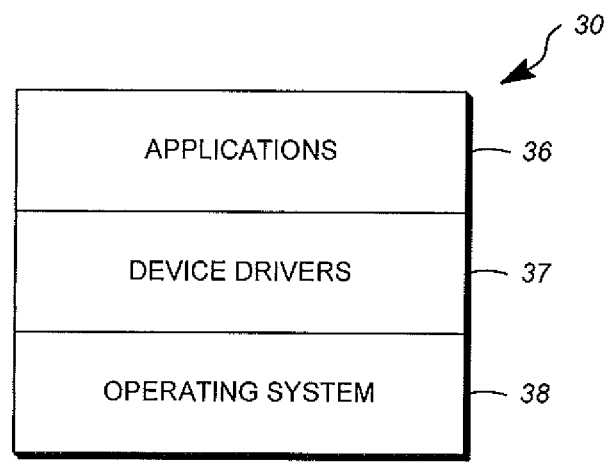
FIG. 5B is a block diagram of the memory of the USB device shown in FIG. 2.

FIG. 5A is a block diagram of the memory 24 of USB host accessory 12 shown in FIG. 2. Memory 24 contains one or more application programs 32, one or more device drivers 33, and an operating system 34. The operating system in this case is the Linux operating system, but other operating systems can be used. FIG. 5B is a block diagram of the memory in function 30 of USB device 14 shown in FIG. 3. The memory in function 30 contains application programs 32, device drivers 34, and an operating system 36. Operating system 36 in this case is Android™ operating system published by Google Inc., of Mountain View, Calif. Other operating systems can be used such as Windows based operating systems published by Microsoft Corporation of Redmond Wash.

Figure 6:
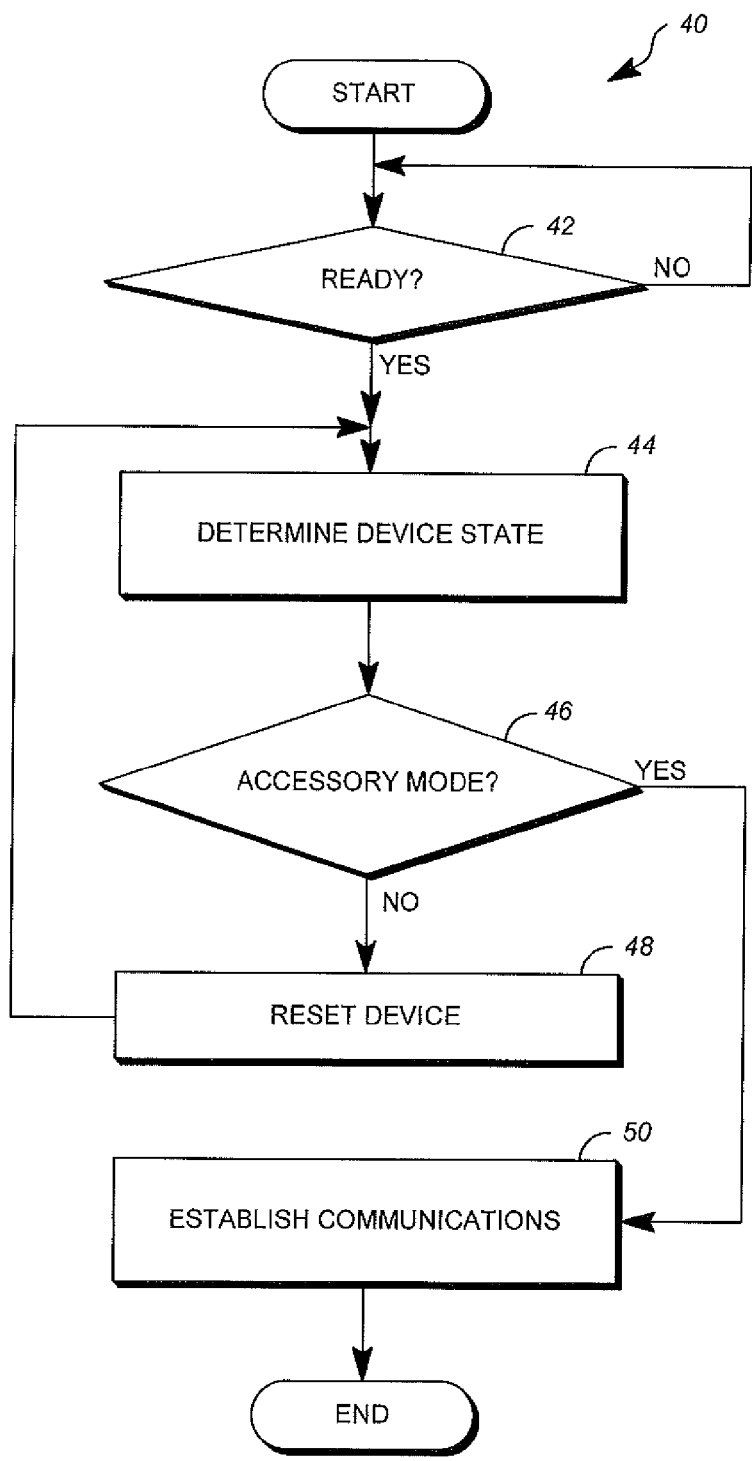
FIG. 6 is a logic flow chart of a process performed by the USB host shown in FIG. 1 to establish communications with the USB device.

FIG. 6 is a logic flow chart of a process 40 performed by the USB host accessory 12 to establish communications with USB device 14. When host accessory 12 is connected to a device such as USB device 14 via USB compatible communications channel 16, host accessory 12 attempts to establish communication with that device in an accessory mode. The accessory mode, which is explained in more detail below, permits device 14 to discover the configuration of host accessory 12 and to acquire application software to interoperate with the software on host accessory 12. This can be accomplished through process 40 shown in FIG. 6. Process 40 is executed by a processor 22 using an application program 32 contained in memory 24.

At step 42, host accessory 12 waits for detection of a connected device such as device 14. If no device is detected, the process loops continuously through step 42 until a device is detected. In practice, polling or interrupt based monitoring can be employed in place of a simple loop as illustrated at step 42. If a device such as device 14 is detected, then, at a step 44, host accessory 12 determines the device's state by querying device 14 for its configuration information (as described below in connection with FIG. 7). The device may have three states: (A) the device supports accessory mode, but is not in accessory mode; (B) the device does not support accessory mode; or (C) the device supports accessory mode and is already in accessory mode.

At decision step 46, if device 14 supports accessory mode and is in accessory mode, then processing moves to step 50, described below, where host accessory 12 establishes communications with device 14 in the accessory mode. This process is explained below in more detail below, but generally involves the host accessory 12 transmitting host configuration information to device 14 and sending a query to device 14 to obtain interface and endpoint descriptors of device 14.

At decision step 46, if device 14 is not in accessory mode but appears to support accessory mode (or optionally, regardless of whether device 14 appears to support accessory mode) processing continues to step 48. At step 48, host accessory 12 will attempt to reset the device into accessory mode, as explained below in connection with FIG. 8. Once the device is reset, processing returns to step 44, where it re-enumerates device 14 by determining the state device 14 as described above. In this iteration of step 44, if device 14 has successfully reset into accessory mode, then device descriptor indicates that indicate that device 14 is supports and is in accessory mode. Processing continues to step 46, where a decision is made as to whether device 14 is in accessory mode. As described above, if device 14 is in accessory mode, processing continues to step 50 where host accessory 12 establishes communication with device 14. Optionally, processing of process 40 can terminate if device 14 fails to enter accessory mode after a predetermined number of reset attempts, which predetermined number can be zero one or more.

Figure 7:
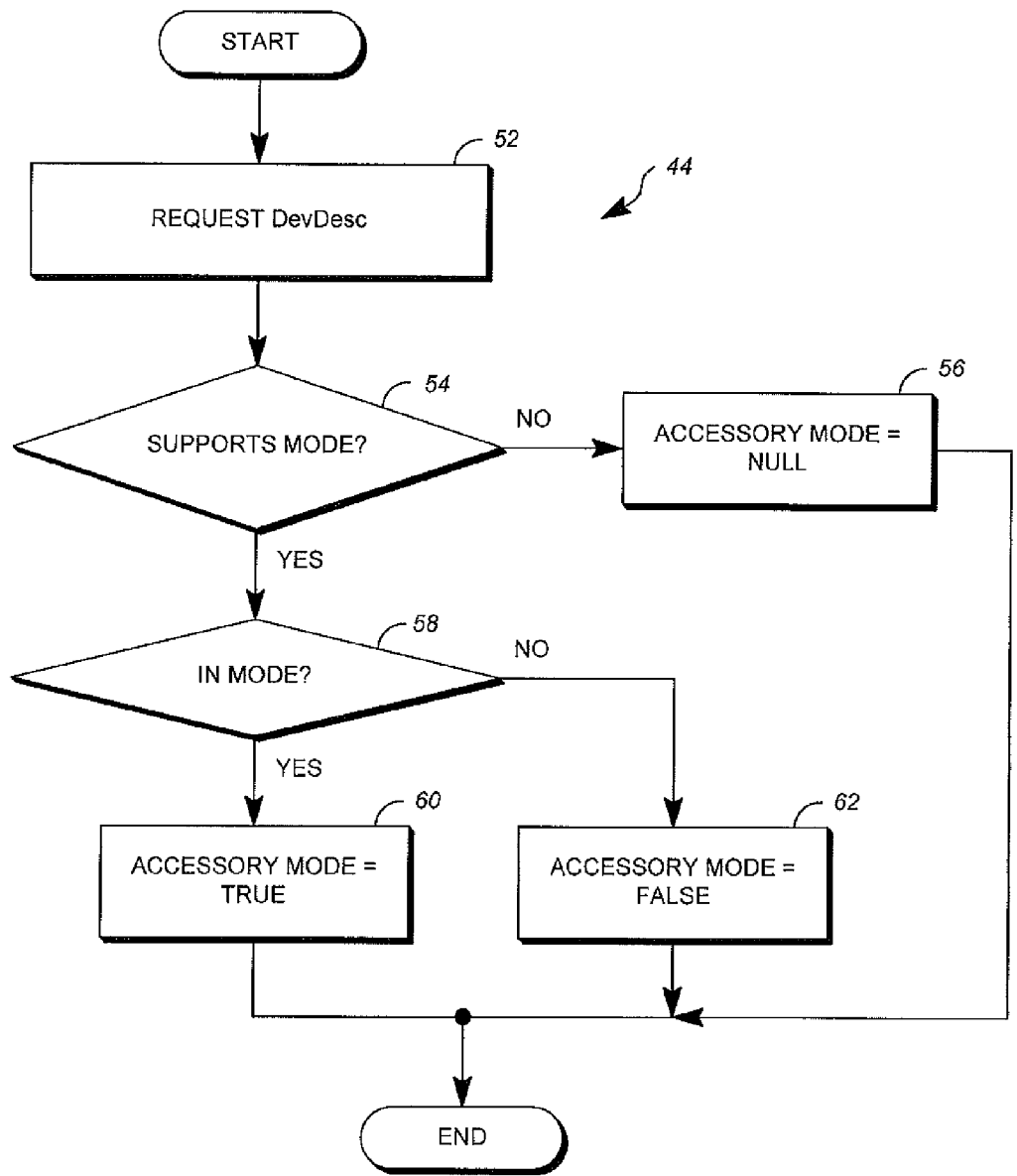
FIG. 7 is logic flow chart of the process performed by the USB host shown in FIG. 1 to determine the state of the USB device.

FIG. 7 is a logic flow chart of a method performed by USB host accessory 12 at step 44 of FIG. 6 to determine the state of the USB device 14. At a step 52 host accessory 12 requests the device descriptor (devDesc) of device 14 using a standard USB communication session. In this example, the device descriptor includes a field for a Vendor ID and a field for a Product ID.

At step 54 a determination is made as to whether device 14 supports the accessory mode after host accessory 12 receives from device 14 the device descriptor requested at step 52. This determination can be made by inspecting the device descriptor (devDesc) received from the device 14. In this case, a specific Vendor ID code is assigned to indicate that the device supports accessory mode. For example, on devices equipped with the Android™ operating system, the Vendor ID indicating that device supports accessory mode can be 0x18D1.

Alternatively, in lieu of performing step 54, it can be assumed that a device does support accessory mode. In that case, step 54 is not performed and processing continues from step 52 to step 58, described below. Alternatively, it can be assumed that a device does support accessory mode unless the Vendor ID is specifically associated with a vendor that does not support accessory mode. Step 54 is optional because regardless of whether the determination is made at step 54 that device 14 does or does not support accessory mode, the attempt to reset the device into accessory mode can still be made at step 48.

If, at step 54, a determination is made that device 14 does not support accessory mode, control processing continues to a step 56 where a Boolean value indicative of accessory mode is set to null. Method 44 terminates after processing at step 56.

If at step 54 a determination is made that device 14 does support accessory mode, then processing continues to a step 58. At step 58 a determination is made as to whether device 14 is in accessory mode. This determination can be made by inspecting the device descriptor (devDesc). In this case, a specific Product ID code is assigned to indicate that the device is in accessory mode. For example, on devices equipped with the Android™ operating system, the Product ID indicative that the device is in accessory mode can be 0x 2D01.

As explained above, processing at step 54 is optional. In implementations that do not perform step 54, processing can proceed from step 52 to step 58. In that case, at step 58 a determination is made as to whether device 14 is in accessory mode as described above.

If at step 58 a determination is made that device 14 is in accessory mode, then processing continues to a step 60 where a Boolean value indicative of accessory mode is set to true. If at step 58, a determination is made that device 14 is not in accessory mode then processing continues to a step 62, where a Boolean value indicative of accessory mode is set to false. Method 44 then is completed. Although not explicitly indicated in FIG. 6, if it is determined at step 54 that a device does not support accessory mode (i.e., the accessory mode Boolean value equals null), then processing of process 40 can terminate. Alternatively, the Boolean value indicative of accessory mode can be set to false even in cases where it cannot be determined whether device 14 actually supports accessory mode or is in that state. Thus, an attempt to reset device 14 (step 48 FIG. 6) can be made in all cases where it is not positively determined that device 14 is in accessory mode, including the case where it does not appear that the device 14 supports accessory mode.

Figure 8:
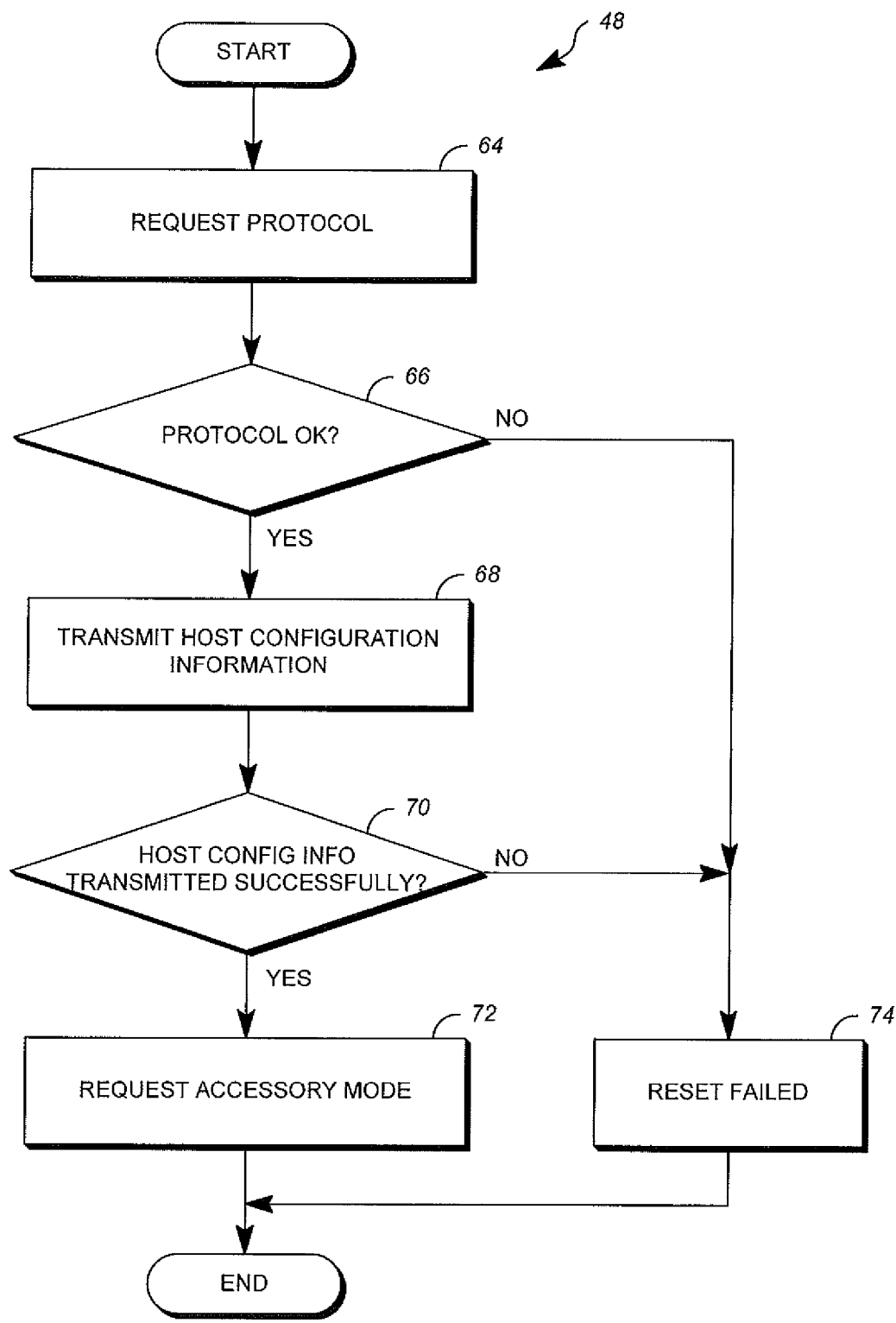
FIG. 8 is a logic flow chart of a process performed by the USB host shown in FIG. 1 to reset the USB device into an accessory mode.

FIG. 8 is a logic flow chart of the method performed by the USB host accessory 12 at step 48 (FIG. 6) to reset the USB device into an accessory mode. As explained above, at step 44 (FIG. 6) of process 40, host accessory 12 determines the state of device 14. This operation is described in greater detail with reference to FIG. 7. As explained above, at step 46 (FIG. 6), a determination is made based on Boolean value set at step 44 as to whether device 14 is in accessory mode. If device 14 is not in accessory mode, then at step 48 (FIG. 6), host accessory 12 resets device 14 into accessory mode. This process is described FIG. 8. At step 64 (FIG. 8), host accessory 12 sends a request to device 14 to transmit the protocol used by device 14. This request can be a control request on endpoint 0 with the following characteristics, for example:

requestType: USB_DIR_IN|USB_TYPE_VENDOR
    request: 51
    value: 0
    index: 0
    data: protocol version number At step 66, a determination is made as to whether the protocol transmitted by device 14 is indicative that device 14 supports accessory mode. If the protocol transmitted by device 14 at step 66 indicates that device 14 supports accessory mode, then processing continues to a step 68. If the protocol transmitted by device 14 indicates that device 14 does not support accessory mode, then processing continues to step 74, where a Boolean value indicative of a failure to reset device 14 can be set to true. At step 68, host accessory 12 transmits to device 14 the configuration information of host accessory 12. Configuration information identifies host accessory 12 and/or its configuration. Configuration information can be transmitted by host accessory 12 in the form of a control request as follows, for example:

requestType: USB_DIR_OUT|USB_TYPE_VENDOR
request: 52
value: 0
index: string ID
data: zero terminated UTF8 string sent from accessory to device The following are examples of possible string IDs:
manufacturer name: 1;
model name: 2;
product designator 3;
description: 4;
version: 5;
URL: 6; and
serial number: 7.

At step 70, a determination is made as to whether the host configuration information was successfully transmitted by host accessory 12 using conventional USB protocols. If the host information was successfully transmitted, host accessory 12 then requests device 14 to enter accessory mode (step 72). This request can be a control request on endpoint 0 with the following characteristics, for example:

requestType: USB_DIR_OUT|USB_TYPE_VENDOR
request: 53
value: 0
index: 0
data: none Although not explicitly shown in FIG. 6, if host accessory 12 fails to reset device 14 (as indicated the Boolean value set at step 74 to indicate such failure), then processing of process 40 can terminate.

The process of establishing communications at step 50 of FIG. 6 will now be described in more detail. If device 14 is detected by host accessory 12 as being in accessory mode, then host accessory 12 discovers the bulk endpoints and sets up communication with device 14. This can be accomplished by host accessory 12 initiating a function to query the configuration descriptor of device 14 to find the interface and bulk data endpoints in which to communicate with device 14. When host accessory 12 discovers the input and output endpoints, it sets endpoint pointers to those addresses.

Figure 9:
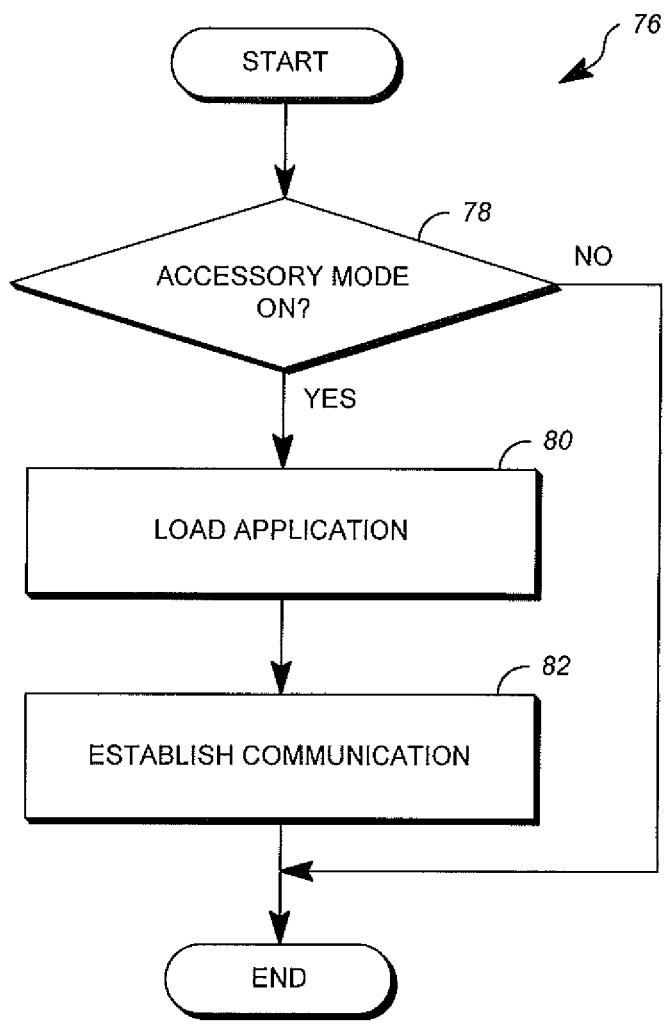
FIG. 9 is a logic flow chart of a process performed by the USB device shown in FIG. 1 to establish communications with the USB host shown in FIG. 1.

FIG. 9 is a logic flow chart of a method 76 performed by USB device 14 to establish communications with USB host accessory 12. As explained above, USB device 14 operates as a slave to host accessory 12 with respect to communications via USB compliant channel 16. At a step 78, device 14 determines whether it is in accessory mode. If a determination is made that device 14 is in accessory mode, processing continues to a step 80 where application software 36 can be loaded into device 14 to permit interoperation with host accessory 12. In connection with this step, it should be noted that at step 68 of FIG. 8, host accessory 12 transmits the configuration information of host accessory 12 to device 14. This configuration information is used by device 14 to determine what application software is required or suitable to interoperate with host accessory 12. If the application software is already resident on device 14, it is loaded into memory. Otherwise, device 14 can attempt to acquire the software. For example the configuration information provided by host accessory 12 can include a URL or other network address (string ID 5). If device 14 is equipped with Internet or other network connectivity, it can access the necessary application software at the specified URL or other network address and load the software into its memory, including via a proxy. Alternatively, device 14 can use other configuration information to look up the URL or other network address. For example, if configuration information includes a manufacturer name or product name, this data can be used as an look-up value to a remote directory to acquire the URL or network address for desired application software.

Processing continues to a step 82 where application-to-application communication is established. It should be noted that general purpose device 14 can provide special purpose functionality when the appropriate application software is loaded at step 80. Thus, host accessory 12 accesses device 14 as a USB compatible function (such as a peripheral). Because the accessory mode permits device 14 to discover the identity of host accessory 12 and dynamically acquire application software for interoperating with the special functions of host accessory 12, the foregoing embodiments enables device 14 to function as one of a broad range of different types of USB-compatible peripheral devices.

Referring to FIGS. 5A and 5B, operating systems 34 and 38 can be equipped to install device drivers 33 and 37, respectively, which allow applications 32 and 36, respectively, to read to and write from USB endpoints. For example, in the foregoing embodiments host accessory 12 is an exercise bicycle that includes memory 24 in which application 32 runs over operating system 34. In this case, application 32 can provide functionality for operating the exercise bicycle such as, for example displaying the speed at which a user pedals the bicycle. Device 14 is a mobile telephone equipped with operating system 38, which in this case is the Android™ operating system. When device 14 is set to accessory mode by host accessory 12 (as described above), device 14 downloads (from the URL specified by host accessory 12) application 36, which is loaded into memory represented by function 30. Device driver 33 installed in memory 24 of host accessory 12 permits application 32 to read to and write from USB endpoints. Likewise, device driver 37 installed in memory 30 of device 14 permits application 36 to read to and write from USB endpoints.

In effect, accessory mode permits device 14 to present to host accessory 12 a virtual USB device. At the same time, device drivers 33, 37 installed in host accessory 12 and device 14 permit permits applications 32, 36 to interoperate via USB communications channel 16 (i.e., to access the appropriate endpoints) without necessarily requiring the use of specialized device drivers for each combination of accessory and device. The embodiments described above can, however, be practiced with such specialized drivers if desired. These can, for example, be downloaded to device 14 with the application software pertinent to host accessory 12.

Figure 10:
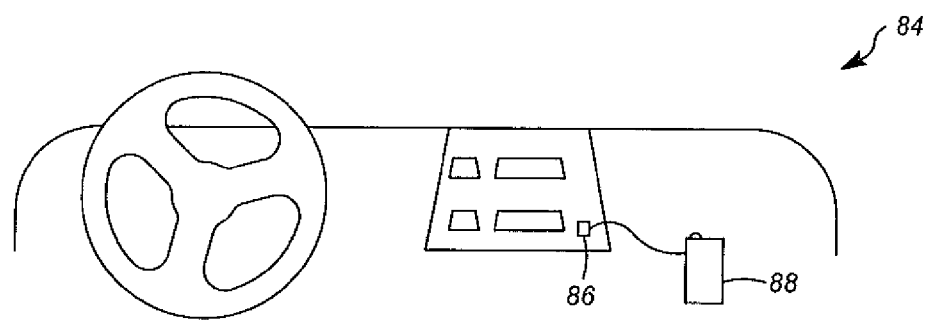
FIG. 10 is front elevation view of the dashboard of a motor vehicle equipped with an embodiment of the invention.

There are many practical applications of the foregoing embodiments. Several examples are illustrated in FIGS. 10-14. FIG. 10 is front elevation view of the dashboard of a motor vehicle 84 equipped with a USB host accessory 86 that is coupled to a USB device 88. In this case, device 88 is a microprocessor-equipped mobile telephone with general computing capabilities similar to device 14 described above. When device 88 is coupled to a host accessory 86, host accessory 86 places device 88 into accessory mode. Device 88 then downloads application software that interoperates with software on motor vehicle 84 via USB communications. Such software can, for example, enable motor vehicle 84 to play music stored on device 88 where the user interface for playing the music can be displayed and managed by the application software running on device 88.

Figure 11:
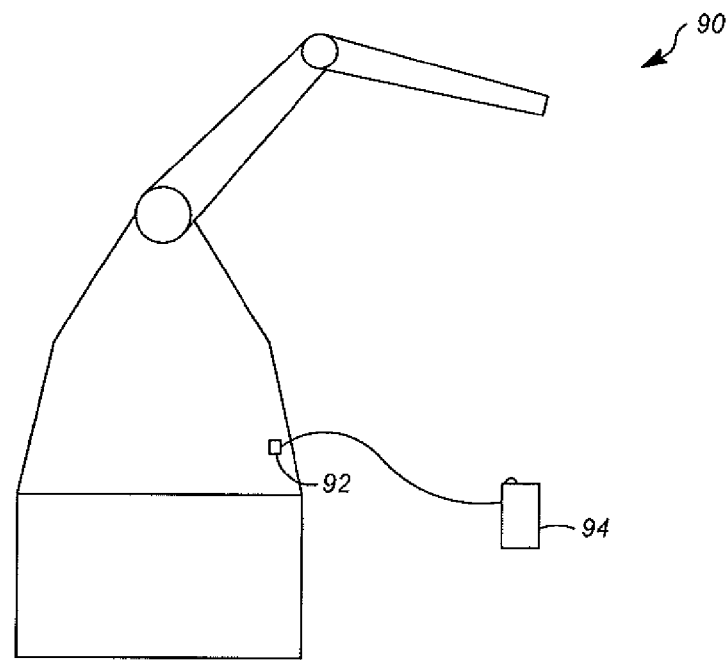
FIG. 11 is a front elevation view of an industrial robot equipped with an embodiment of the invention.

FIG. 11 is a front elevation view of an industrial robot 90 equipped with a USB host accessory 92 that is coupled to a USB device 94. In this case, device 94 is a microprocessor-equipped mobile telephone with general computing capabilities similar to devices 14 and 88 described above. When device 94 is coupled to host accessory 92, host accessory 92 places device 94 into accessory mode in accordance with the embodiments described above. Device 94 then downloads application software that interoperates with software on robot 90 via USB communications. Such software can, for example, enable a technician or other user of device 94 to run diagnostics on or otherwise control the movement of robot 90. This control is exercised through device 94 even though device 94 is the slave in the USB communication between the robot's host accessory 92 and device 94.

Figure 12:
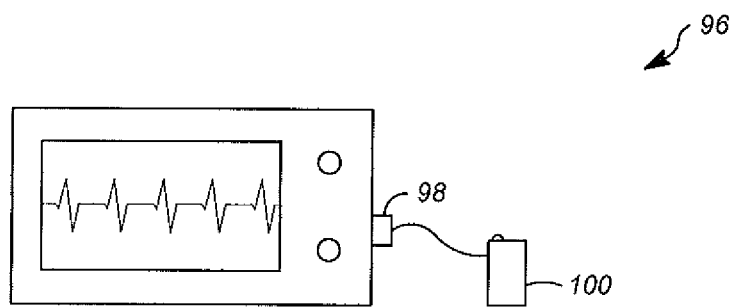
FIG. 12 is a front elevation view of a medical device equipped with an embodiment the invention.

FIG. 12 is a front elevation view of a medical device 96 equipped with a USB host accessory 98 that is coupled to a USB device 100. In this case, device 100 is a microprocessor-equipped mobile telephone with general computing capabilities similar to devices 14, 88 and 94 described above. When device 100 is coupled to host accessory 98, host accessory 98 places device 100 to accessory mode in accordance with the embodiments described above. Device 100 then downloads application software that interoperates with software on medical device 96. Such software can, for example, enable a doctor or other user of device 100 to generate reports based on the data collected by medical device 96. These reports can be generated by device 100 in response to user commands entered into device 100 by accessing information stored in medical device 96 through USB host accessory 98 (even though device 100 is the slave in the USB communication with host accessory 98).

Figure 13:
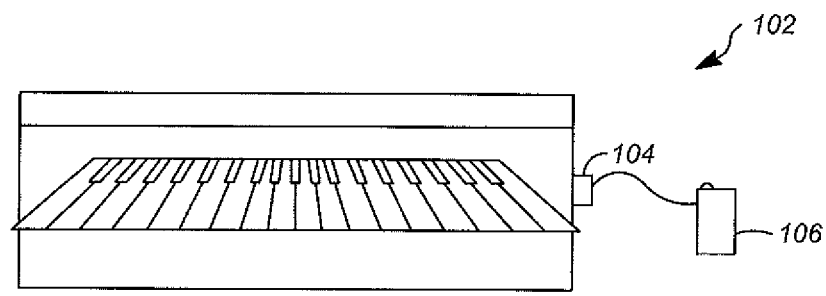
FIG. 13 is a front elevation view of a music generating device equipped with an embodiment of the invention.

FIG. 13 is a front elevation view of a music generating device 102 equipped with a USB host accessory 104 that is coupled to a USB device 106. In this case, device 106 is a microprocessor-equipped mobile telephone with general computing capabilities similar to devices 14, 88, 94 and 100 discussed above. When device 106 is coupled to host accessory 104, host accessory 104 places device 106 into accessory mode in accordance with the embodiments described above. Device 106 then downloads application software that interoperates with software on music generating device 102. Such software can, for example, enable a musician or other user of device 106 to play music (stored on device 106) on music generating device 102. This operation can be initiated in response to user commands entered into device 106, which can initiate the playing of music (stored on device 106) on music generating device 102 through communications with host accessory 104 (even though device 106 is the slave in the USB communication with host accessory 104).

Figure 14:
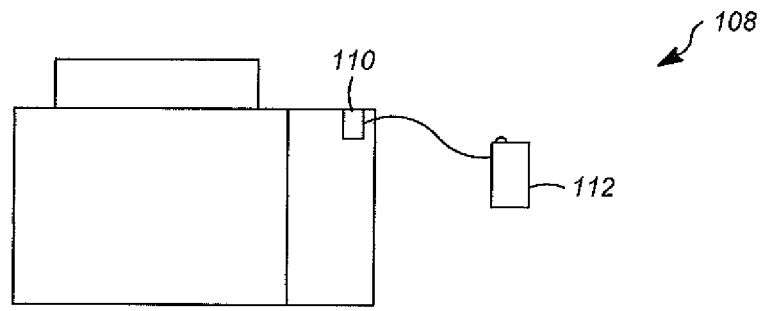
FIG. 14 is a front elevation view of an office machine equipped with an embodiment of the invention.

FIG. 14 is a front elevation view of an office machine 108 that is equipped with a USB host accessory 110 that is coupled to a USB device 112. Office machine 108 can be printer or photocopier or other type of office equipment). In this case, device 112 is a microprocessor-equipped mobile telephone with general computing capabilities similar to devices 14, 80, 94, 100, and 106 discussed above. When device 112 is coupled to host accessory 110, host accessory 110 places device 112 into an accessory mode in accordance with the embodiments described above. Device 112 then downloads application software that interoperates with software on photocopier 108. Such software can, for example, enable a user of device 112 to reproduce a document storage device 112 using the printing and copying facilities of photocopier 108. This operation can be initiated in response to user commands entered into device 112.

All or a portion of embodiments of the present invention can take the form of a computer program product accessible from, for example, a computer-usable or computer-readable medium. A computer-usable or computer-readable medium can be any device that can, for example, contain, store, communicate, or transport the program for use by or in connection with any computing system or device. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for serial communication between a Universal Serial Bus host and a Universal Serial Bus device, comprising:
   connecting the Universal Serial Bus host and Universal Serial Bus device via a Universal Serial Bus communications channel;
   transmitting a request from the Universal Serial Bus host to the Universal Serial Bus device to return device configuration information;
   determining whether the Universal Serial Bus device supports an accessory mode according to the requested device configuration information;
   when it is determined that the Universal Serial Bus device supports the accessory mode, transmitting host configuration information from the USB host to the USB device sufficient to permit the Universal Serial Bus device to identify the Universal Serial Bus host;
   identifying an application using at least some of the host configuration information;
   transmitting a power signal from the Universal Serial Bus host to the Universal Serial Bus device, to charge a battery on the Universal Serial Bus device;
   executing the application on the Universal Serial Bus device;
   receiving a control signal, based on the application, from the Universal Serial Bus device at the Universal Serial Bus host; and
   executing an action of the Universal Serial Bus host, based on the received control signal.

2. The method of claim 1, wherein the host configuration information includes at least one of a host serial number, host manufacturer, and host product designator.

3. The method of claim 1, further comprising:
   transmitting a request from the Universal Serial Bus host to the Universal Serial Bus device to enter into the accessory mode wherein the USB device accepts host configuration information.

4. The method of claim 1, further comprising:
   determining whether the Universal Serial Bus device is in the accessory mode in which the Universal Serial Bus device can accept host configuration information from the Universal Serial Bus host.

5. The method of claim 4, further comprising:
   if it is determined that the Universal Serial Bus device is not in the accessory mode, then transmitting a request from the Universal Serial Bus host to the Universal Serial Bus device to switch to the accessory mode.

6. The method of claim 4, wherein determining whether the Universal Serial Bus device is in the accessory mode further comprises:
   determining that the Universal Serial Bus device is in the accessory mode based on at least a portion of the device configuration information being indicative of the accessory mode.

7. The method of claim 6, wherein the at least a portion of the device configuration information includes at least one of a product identification code or a manufacturer identification code.

8. A method of claim 1, wherein the host configuration information includes network address, and wherein the method further comprises:
   downloading, to the Universal Serial Bus device, software located at the network address.

9. A method of claim 1, wherein the host configuration information includes product information identifying one of the manufacturer or product identification of the Universal Serial Bus host, and wherein the method further comprises:
   determining a remote network address based on the product information; and
   downloading, to the Universal Serial Bus device, software located at the network address.

10. The method of claim 1, wherein the Universal Serial Bus device is one of a handheld computing device and the Universal Serial Bus host is a special purpose accessory.

11. The method of claim 1, further comprising:
   exchanging application data between the Universal Serial Bus device and Universal Serial Bus host while the Universal Serial Bus device is under the control of the selected application.

12. A method for using a handheld computing device as a peripheral to a USB host, comprising:
   connecting the Universal Serial Bus host to the handheld computing device a Universal Serial Bus communications channel in which the handheld computing device functions as a Universal Serial Bus device;
   transmitting a request from the Universal Serial Bus host to the Universal Serial Bus device to return device configuration information;
   determining whether the Universal Serial Bus device supports an accessory mode according to the requested device configuration information;
   when it is determined that the Universal Serial Bus device supports the accessory mode, transmitting a request from the Universal Serial Bus host to the Universal Serial Bus device to enter into the accessory mode which enables the USB device to receive an application for interoperating with one or more functions of the Universal Serial Bus host, wherein the Universal Serial Bus device accepts host configuration information;
   determining whether the Universal Serial Bus device is in the accessory mode;
   if the Universal Serial Bus device is determined to be in the accessory mode, then transmitting host configuration information from the Universal Serial Bus host to the Universal Serial Bus device sufficient to permit the Universal Serial Bus device to identify the Universal Serial Bus host;
   transmitting a power signal from the Universal Serial Bus host to the Universal Serial Bus device, to charge a battery on the Universal Serial Bus device;
   receiving a control signal, based on the application, from the Universal Serial Bus device at the Universal Serial Bus host; and
   executing an action of the Universal Serial Bus host, based on the received control signal.

13. The method of claim 12, wherein determining whether the Universal Serial Bus device is in the accessory mode further comprises:
   determining that the Universal Serial Bus device is in the accessory mode based on at least a portion of the device configuration information being indicative of the accessory mode.

14. A system for serial communication, comprising:
   a Universal Serial Bus accessory and a Universal Serial Bus device;
   a Universal Serial Bus communications channel coupling the Universal Serial Bus host and Universal Serial Bus device; and
   a host memory and a host processor wherein the host processor is configured to execute instructions in the host memory to:
   transmit a request from the Universal Serial Bus host to the Universal Serial Bus device to return device configuration information;
   determine whether the Universal Serial Bus device supports an accessory mode according to the requested device configuration information;
   when it is determined that the Universal Serial Bus device supports the accessory mode, transmit host configuration information from the Universal Serial Bus host to the Universal Serial Bus device sufficient to permit the Universal Serial Bus device to identify the Universal Serial Bus host;
   transmit a power signal from the Universal Serial Bus host to the Universal Serial Bus device, to charge a battery on the Universal Serial Bus device;
   receive a control signal, based on the application, from the Universal Serial Bus device at the Universal Serial Bus host; and
   execute an action of the Universal Serial Bus host, based on the received control signal.

15. The system of claim 14, wherein the host configuration information includes at least one of a host serial number, host manufacturer, and host product designator.

16. The system of claim 14, wherein the processor is further configured to:
   determine, based on the device configuration information whether, the Universal Serial Bus device is in the accessory mode.

17. The system of claim 14, further comprising:
   a device memory and a device processor, wherein the device processor is configured to execute instructions in the device memory to:
   receive a transmission from the Universal Serial Bus host to the Universal Serial Bus device including host configuration information;
   determine a network address from the host configuration information;
   request, from a server located at the network address, a download of information pertaining to the host; and
   load into device memory the downloaded information.

18. The system of claim 17, wherein the host processor is further configured to execute a host application program in host memory, and wherein the downloaded information includes downloaded software that, when executed by the device processor, permits the device processor to exchange data with the host processor, which data is manipulated by both the host application program and the downloaded software.

19. The system of claim 14, wherein the device is one of a handheld mobile telephone or a handheld computing device.

20. The system of claim 14, wherein the Universal Serial Bus host is one of: an exercise machine, a motor vehicle, a music generating device, an office machine or a medical device.

21. A system for serial communication between a Universal Serial Bus host and a Universal Serial Bus device comprising:

the Universal Serial Bus host connected to the Universal Serial Bus device via a Universal Serial Bus communications channel;

the Universal Serial Bus host configured to:
transmit a request from the Universal Serial Bus host to the Universal Serial Bus device to return device configuration information;
determine whether the Universal Serial Bus device supports an accessory mode according to the requested device configuration information;
when it is determined that the Universal Serial Bus device supports the accessory mode, transmit host configuration information to the Universal Serial Bus device sufficient to permit the Universal Serial Bus device to identify the Universal Serial Bus host;

the Universal Serial Bus device configured to:
identify an application using at least some of the host configuration information;
execute the application on the Universal Serial Bus device;
provide a control signal, based on the executed application, to the Universal Serial Bus host; and
execute an action of the Universal Serial Bus host, based on the received control signal.

22. The system of claim 21, wherein the host configuration information includes at least one of a host serial number, host manufacturer, and host product designator.

23. The system of claim 21, further configured to:
transmit a request from the Universal Serial Bus host to the Universal Serial Bus device to enter into the accessory mode wherein the Universal Serial Bus device accepts host configuration information.

24. The system of claim 1, further configured to:
determine whether the Universal Serial Bus device is in the accessory mode in which the Universal Serial Bus device can accept host configuration information from the Universal Serial Bus host.

25. The system of claim 24, wherein if it is determined that the Universal Serial Bus device is not in the accessory mode, then transmitting a request from the Universal Serial Bus host to the Universal Serial Bus device to switch to the accessory mode.

26. The system of claim 24, wherein determining whether the USB device is in the accessory mode further comprises:
determining that the Universal Serial Bus device is in the accessory mode based on at least a portion of the device configuration information being indicative of the accessory mode.

27. The system of claim 26, wherein the at least a portion of the device configuration information includes at least one of a product identification code or a manufacturer identification code.

28. The system of claim 21, wherein the host configuration information includes network address, and wherein the system is further configured to:
download, to the Universal Serial Bus device, software located at the network address.

29. The system of claim 21, wherein the host configuration information includes product information identifying one of the manufacturer or product identification of the USB host, and wherein the system is further configured to:
determine a remote network address based on the product information; and
download, to the Universal Serial Bus device, software located at the network address.

30. The system of claim 21, wherein the Universal Serial Bus device is one of a handheld computing device and the Universal Serial Bus host is a special purpose accessory.

31. The system of claim 21, further configured to:
exchange application data between the Universal Serial Bus device and Universal Serial Bus host while the Universal Serial Bus device is under the control of the selected application.

32. The system of claim 21, further configured to transmit a power signal from the Universal Serial Bus host to the Universal Serial Bus device, to charge a battery on the Universal Serial Bus device.

* * * * *